United States Patent
Shray et al.

(10) Patent No.: US 6,675,101 B1
(45) Date of Patent: Jan. 6, 2004

(54) METHOD AND SYSTEM FOR SUPPLYING WELL LOG DATA TO A CUSTOMER

(75) Inventors: Frank P. Shray, Sugar Land, TX (US); Denis J. Heliot, Sugar Land, TX (US); John P. Horkowitz, Sugar Land, TX (US); Thomas J. Neville, Houston, TX (US); Pascal F. Rothnemer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/065,746

(22) Filed: Nov. 14, 2002

(51) Int. Cl.[7] ............................................... G01V 11/00
(52) U.S. Cl. ............................................................ 702/6
(58) Field of Search .............................. 702/6, 7, 9, 12, 702/13, 14, 16; 703/10

(56) References Cited

U.S. PATENT DOCUMENTS

| | | | |
|---|---|---|---|
| 6,101,445 A | 8/2000 | Alvarado et al. | |
| 6,195,092 B1 * | 2/2001 | Dhond et al. | 345/763 |
| 6,408,953 B1 | 6/2002 | Goldman et al. | |
| 2001/0042642 A1 | 11/2001 | King | |

FOREIGN PATENT DOCUMENTS

| | | |
|---|---|---|
| WO | WO 00/77711 A1 | 12/2000 |
| WO | WO 01/23705 A1 | 4/2001 |
| WO | WO 01/27858 A1 | 4/2001 |

* cited by examiner

Primary Examiner—Donald E. McElheny, Jr.
(74) Attorney, Agent, or Firm—Victor H. Segúra; Brigitte L. Jeffery; John J. Ryberg (57) ABSTRACT

A method for supplying a customer with well log data including obtaining wellsite properties from the customer, recommending at least one tool string and analysis software tool combination using the wellsite properties, processing well log data using customer domain information and the least one tool string and analysis software tool combination to obtain processed well log data, viewing the processed well log data using an interactive viewer, manipulating the customer domain information, and updating the processed well log data on the interactive viewer using the manipulated customer domain information.

17 Claims, 6 Drawing Sheets

(PRIOR ART)

| ANSWER TYPES / LITHOLOGY TYPE → | SHALY SANDS | CARBONATES | COAL BED/METHANE |
|---|---|---|---|
| QUANTIFY RESERVES AND PRODUCIBILITY | TOOL STRING A, ANALYSIS SOFTWARE TOOL A; TOOL STRING A', ANALYSIS SOFTWARE TOOL A' *106* | TOOL STRING B ANALYSIS SOFTWARE TOOL B *108* | TOOL STRING C ANALYSIS SOFTWARE TOOL C *110* |
| OPTIMIZE DRILLING PROCESS | TOOL STRING D ANALYSIS SOFTWARE TOOL D *112* | TOOL STRING E ANALYSIS SOFTWARE TOOL E *114* | *116* |
| OPTIMIZE COMPLETIONS AND PERFORATIONS | TOOL STRING G ANALYSIS SOFTWARE TOOL G *118* | TOOL STRING H ANALYSIS SOFTWARE TOOL H *120* | TOOL STRING I ANALYSIS SOFTWARE TOOL I *122* |

METHOD AND SYSTEM FOR SUPPLYING WELL LOG DATA TO A CUSTOMER

BACKGROUND OF INVENTION

1. Field of the Invention

The invention relates generally to the field of well log data acquisition and interpretation. More specifically, the invention relates to methods and systems for supplying well log data to a customer.

2. Background Art

Well logs are measurements, typically with respect to depth, of selected physical parameters of earth formations penetrated by a wellbore. Well logs are typically recorded by inserting various types of measurement instruments into a wellbore, moving the instruments along the wellbore, and recording the measurements made by the instruments. One type of well log recording includes lowering the instruments at the end of an armored electrical cable, and recording the measurements mad e with respect to the length of the cable extended into the well bore. Depth within the wellbore is inferred from the extended length of the cable. Recordings made in this way are substantially directly correlated to measurement depth within the wellbore. Other methods for measurement include a "logging while drilling" (LWD) method, a measurement while drilling (MWD), and a memory logging method. The LWD method involves attaching the instruments to the lower portion of a drilling tool assembly used to drill the wellbore. LWD and wireline tools are typically used to measure the same sort of formation properties, such as density, resistivity, gamma ray, neutron porosity, etc. MWD tools are typically used to measure parameters closely associated with drilling, such as well deviation, well azimuth, weight-on-bit, mud flowrate, annular borehole pressure, etc.

The aforementioned well logging tools may be conveyed into and out of a well via wireline cable, drilling pipe, coiled tubing, slickline, etc. Further, LWD and MWD measurement methods allow for measurement in the drill string while the bit is cutting, or measurement while tripping down or up past a section of a borehole that had been drilled at a previous time.

Some measurement tools use a pressure modulation telemetry system, which modulates pressure of a drilling fluid (mud) flowing through the interior of the drilling tool assembly, to obtain well log data. However, a much larger quantity of well log data is stored in a recording device disposed in the log instrument, which is interrogated when the instrument is retrieved from the wellbore. This information is typically recorded with respect to time. A record of instrument position in the wellbore with respect to time made at the earth's surface is then correlated to the time/measurement record retrieved from the instrument storage device to generate a conventional "well log " of measurements with respect to wellbore depth.

Well logs are typically presented in a graphic form including a plurality of grids or "tracks" each of which is scaled from a selected lower value to a selected upper value for each measurement type presented in the particular track. A "depth track" or scale, which indicates depth in the wellbore, is typically positioned between two of the tracks. Depending on the needs of the particular user, any number of or type of measurements may be presented in one or more of the tracks. A typical well log presentation of an individual measurement is in the form of a substantially continuous curve or trace. Curves are interpolated from discrete measurement values stored with respect to time and/or depth in a computer or computer-readable storage medium. Other presentations include gray scale or color scale interpolations of selected measurement types to produce the equivalent of a visual image of the wellbore wall. Such "image" presentations have proven useful in certain types of geologic analysis.

Interpreting well log data includes correlation or other use of a very large amount of ancillary information. Such ancillary information includes the geographic location of the wellbore, geologic and well log information from adjacent wellbores, and a priori geological/petrophysical knowledge about the formations. Other information includes the types of instruments used, their mechanical configuration and records relating to their calibration and maintenance. Still other types of information include the actual trajectory of the wellbore, which may traverse a substantial geographic distance in the horizontal plane with respect to the surface location of the wellbore. Other information of use in interpreting well log data includes data about the progress of the drilling of the wellbore, the type of drilling fluid used in the wellbore, and environmental corrections applicable to the particular log instruments used.

Much of this ancillary information is applicable to any well log recorded with a particular type of well log instrument. For example, an instrument, which measures naturally occurring gamma radiation ("gamma ray"), has environmental corrections, which correspond only to the type of instrument. As one example, each wireline type gamma ray device of a selected external diameter from a particular wireline operator has the same environmental corrections for "mud weight" (drilling fluid density). Other types of ancillary information are made available from the wellbore operator (typically an oil and gas producing entity). Examples of this type of information include the geographic location of the wellbore and any information from other wellbores in the vicinity. Still other types of ancillary information include records of initial and periodic calibration and maintenance of the particular instruments used in a particular wellbore. The foregoing is only a small subset of the types of ancillary information, which may be used in interpreting a particular well log.

Figure 1:
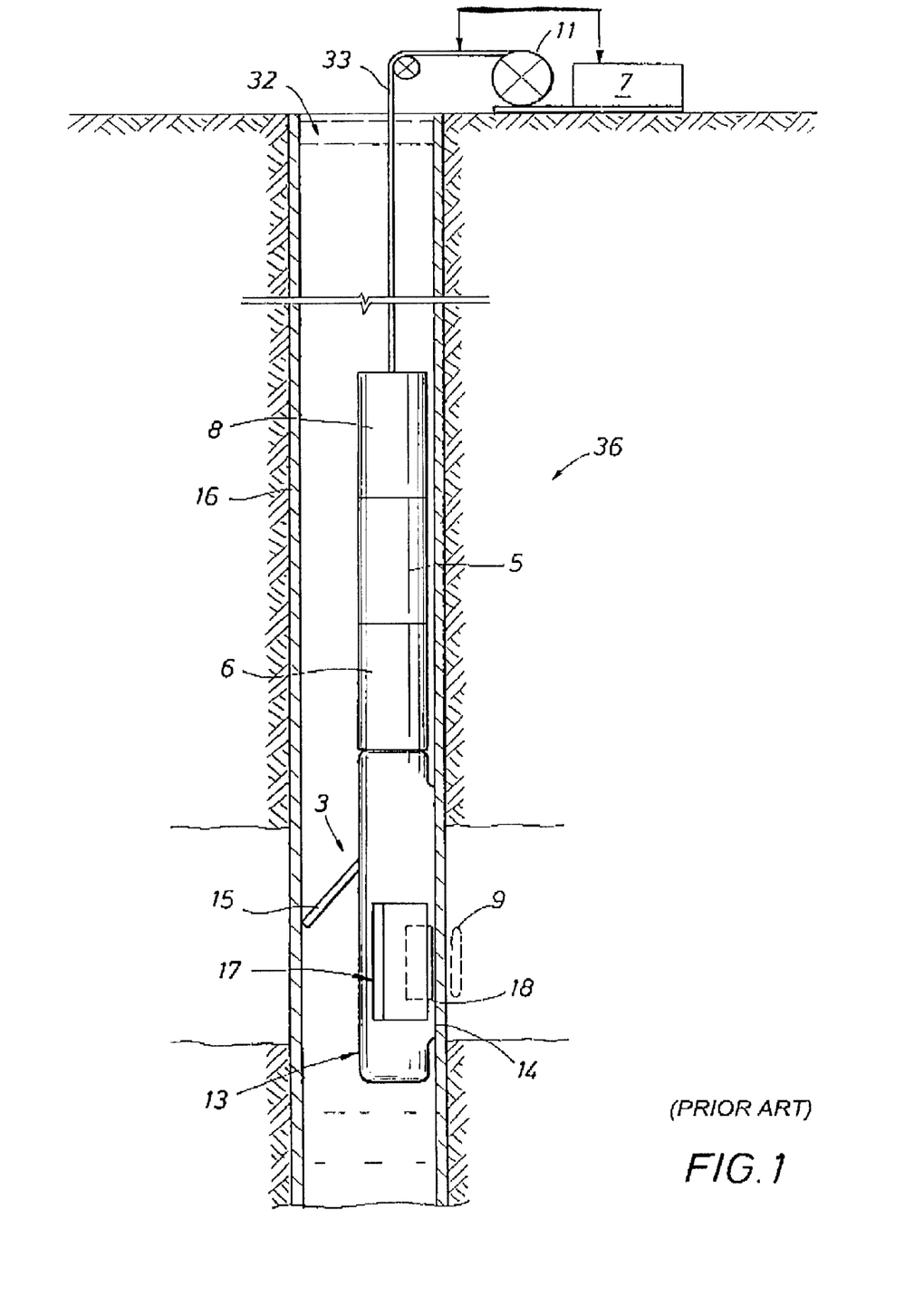
FIG. 1 shows typical well log data acquisition using a wireline conveyed instrument.

FIG. 1 shows a typical manner in which well log data are acquired by "wireline," wherein an assembly or "string" of well log instruments (including sensors or "sondes" (8, 5, 6 and 3) as will be further explained) is lowered into a wellbore (32) drilled through the earth (36) at one end of an armored electrical cable (33). The cable (33) is extended into and withdrawn from the wellbore (32) by means of a winch (11) or similar conveyance known in the art. The cable (33) transmits electrical power to the instruments (8, 5, 6, 3) in the string, and communicates signals corresponding to measurements made by the instruments (8, 5, 6, 3) in the string to a recording unit (7) at the earth's surface. The recording unit (7) includes a device (not shown) to measure the extended length of the cable (33). Depth of the instruments (8, 5, 6, 3) within the wellbore (32) is inferred from the extended cable length. The recording unit (7) includes equipment (not shown separately) of types well known in the art for making a record with respect to depth of the instruments,(sensors) (8, 5, 6, 3) within the wellbore (32).

The sensors (8, 5, 6, and 3) may be of any type well known in the art for purposes of the invention. These include gamma ray sensors, neutron porosity sensors, electromagnetic induction resistivity sensors, nuclear magnetic resonance sensors, and gamma-gamma (bulk) density sensors. Some sensors, such as (8, 5, and 6) are contained in a sonde "mandrel" (axially extended cylinder) which may operate effectively near the center of the wellbore (32) or displaced toward the side of the wellbore (32). Others sensors, such as a density sensor (3), include a sensor pad (17) disposed to one side of the sensor housing (13) and have one or more detecting devices (14) therein. In some cases, the sensor (3) includes a radiation source (18) to activate the formations (36) proximate the wellbore (32). Such sensors are typically responsive to a selected zone (9) to one side of the wellbore (32). The sensor (30) may, also include a caliper arm (15), which serves both to displace the sensor (30) laterally to the side of the wellbore (32) and to measure an apparent internal diameter of the wellbore.

The instrument configuration shown in FIG. 1 is only meant to illustrate in general terms acquiring "well log" data by "wireline" and is not intended to limit the scope of the invention.

Figure 2:
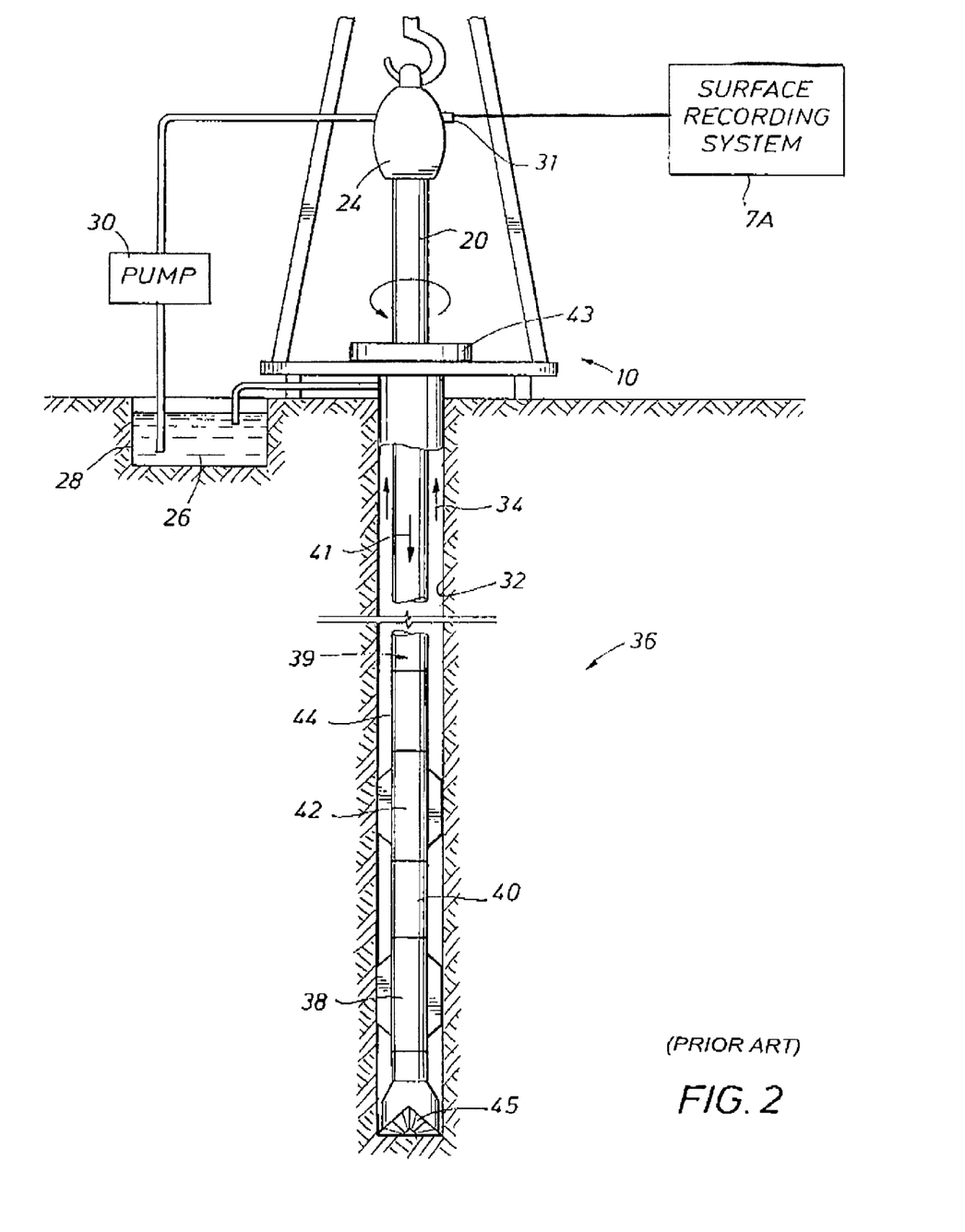
FIG. 2 shows a typical well log data acquisition system using a LWD/MWD method.

FIG. 2 shows a typical configuration for acquiring well log data using a logging while drilling (LWD) and measurements while drilling (MWD) system (39). The LWD/MWD system (39) may include one or more collar sections (44, 42, 40, 38) coupled to the lower end of a drill pipe (20). The LWD/MWD system (39) includes a drill bit (45) at the bottom end to drill the wellbore (32) through the earth (36). In this example, drilling is performed by rotating the drill pipe (20) by means of a rotary table (43). However, drilling may also be performed by top drives and coiled tubing drilling with downhole motors. During rotation, the pipe (20) is suspended by equipment on a drill rig (10) including a swivel (24), which enables the pipe (20) to rotate while maintaining a fluid tight seal between the interior and exterior of the pipe (20). Mud pumps (30) draw drilling fluid ("mud") (26) from a tank or pit (28) and pump the mud (26) through the interior of the pipe (20), down through the LWD/MWD system (39), as indicated by arrow (41). The mud (26) passes through orifices (not shown) in the bit (45) to lubricate and cool the bit (45), and to lift drill cuttings in through an annulus (34) between the pipe (20), LWD/MWD system (39), and the wellbore (32).

The collar sections (44, 42, 40, 38) include sensors (not shown) therein which make measurements of various properties of the earth formations (36) through which the wellbore (32) is drilled. These measurements are typically recorded in a recording device (not shown) disposed in one or more of the collar sections (44, 42, 40, 38). LWD systems known in the art typically include one or more sensors (not show) which measure formation properties such as density, resistivity, gamma ray, neutron porosity, etc. as described above. MWD systems known in the art typically include one or more sensors (not show) which measure selected drilling parameters, such as inclination and azimuthal trajectory of the wellbore (32). MWD systems also provide the telemetry (communication system) for any MWD/LWD tool sensors in the drill string. Other drilling sensors known in the art may include axial force (weight) applied to the LWD/MWD system (39), and shock and vibration sensors.

The LWD/MWD system (39) typically includes a mud pressure modulator (not shown separately) in one of the collar sections (44). The modulator (not shown) applies a telemetry signal to the flow of mud (26) inside the system (39) and pipe (20) where the telemetry signal is detected by a pressure sensor (31) disposed in the mud flow system. The pressure sensor (31) is coupled to detection equipment (not shown) in the surface recording system (7A), which enables recovery and recording of information transmitted in the telemetry scheme sent by the MWD portion of the LWD/MWD system (39). As explained, the telemetry scheme includes a subset of measurements made by the various sensors (not shown separately) in the LWD/MWD system (39). The telemetry of the logging tools may also be determined using wireline cable (not shown), or electrical MWD telemetry (i.e., using electrical signals transmitted through the formation). The remainder of the measurements made by the sensors (not shown) in the LWD/MWD system (39) may be transferred to the surface recording system (7A) when the LWD/MWD system (39) is withdrawn from the wellbore.

In a similar manner to the wireline acquisition method and system shown in FIG. 1, the LWD/MWD acquisition system and method shown in FIG. 2 is only meant to serve as an example of how data are acquired using MWD/LWD systems, and is not in any way intended to limit the scope of the invention.

Figure 3:
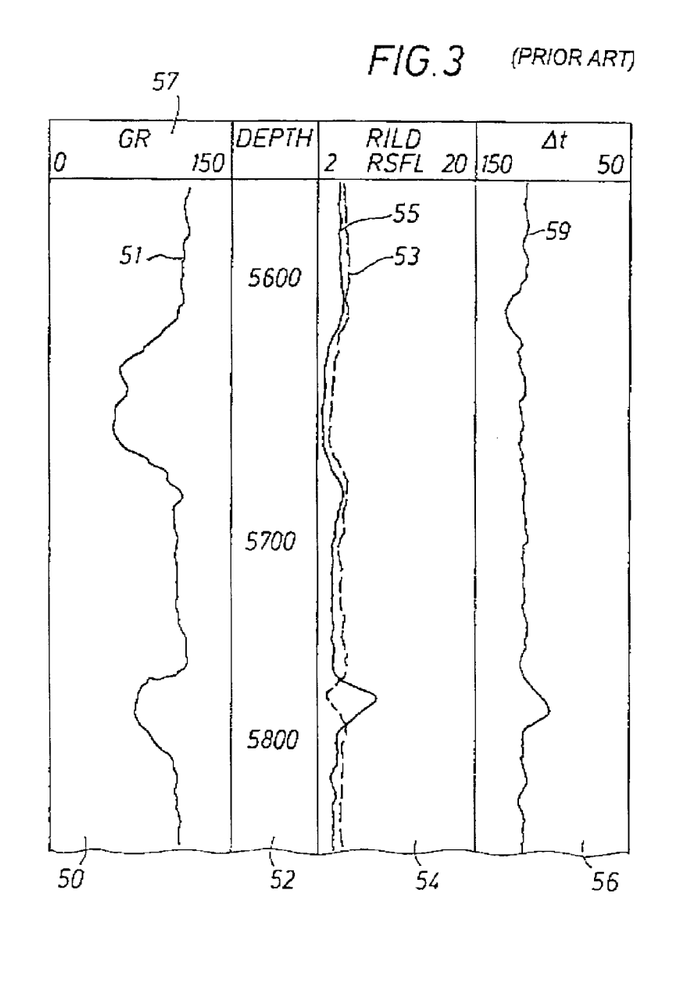
FIG. 3 shows an example of a well log data presentation.

A typical well log data presentation is shown in FIG. 3. The data presentation shown in FIG. 3 is typically made substantially entirely from data recorded by the well log instrument and entered in the recording system by an operator at the wellsite. As described above, the well log data are typically presented on a grid-type scale including a plurality of data tracks (50, 54, 56). The presentation shown in FIG. 3 is a standard format prescribed in, *Standard Practice* 31A, published by the American Petroleum Institute, Washington, D.C. which includes 3 such tracks. The tracks (50, 54, 56) include a header (57) which indicates the data type(s) for which a curve or curves, (51, 53, 55, 59) are presented in each track. A depth track (52), which shows the measured depth (or alternative depth measure such as true vertical depth) of the data is disposed laterally between the first (50) and second (54) data tracks. The depth tracks (52) may alternatively use a time-based scale. Data curves (51, 52, 53, 54) are presented in each of the tracks (50, 54, 56) corresponding to the information shown in the header (57). The example data presentation of FIG. 3 is only one example of data presentations which may be used with a method according to the invention and is not intended to limit the scope of the invention.

A presentation such as shown in FIG. 3 may include in the various curves (51, 53, 55, 59) "raw" data, such as values of voltages, detector counts, etc. actually recorded by the various sensors in the well log instrument (not shown in FIG. 3), or more commonly, shows values recorded by the sensors converted to values of a parameter of interest, such as natural gamma radiation level, resistivity, acoustic travel time, etc. These presentations may generally be made only from the raw data themselves and universally applied scaling and correction factors. Still other presentations of the various curves may include data to which environmental corrections have been applied. Typically, raw data and such minimally corrected data may be recorded at the wellsite without the need to enter significant amounts of data other than the data recordings from the instruments themselves.

Traditionally, a customer specifies the various types of well log tools used to obtain well log data (e.g., Array Induction Imager Tool (AIT), Elemental Capture Sonde (ECS), etc.). There are numerous well logging tools and corresponding analysis software available in the industry. However, each well logging tool (or set of well logging tools) and corresponding analysis software tool(s) is suited for only some conditions, and some types of sensors, but not for others. It is a confusing, time intensive task to determine which well logging tools and corresponding analysis software tools to use to obtain a certain set of logging tool measurements in a certain set of conditions. Depending on the skill level and experience of the customer, a broad set of well logging tools and analysis software tools (some of which provide information that is not relevant or in some cases do not provide enough information) may be chosen. In some cases the choice of a given tool string and analysis software tools (i.e., a set of well logging tools) is based on the past experience of the customer. In other cases, pre-job planning is carried out by the customer to determine if a given tool string and analysis software tool provides the expected results. Choosing the proper set of well logging tools (i.e., the tool sting) is essential since typically only one opportunity exists to gather well log data for a particular well.

Further, once the tool string has been chosen and the well log data obtained at the wellsite, the customer typically inputs a series of values into an analysis software tool (e.g., FEQL a surface computational analysis program used for well log data interpretation). In traditional analysis software tools, such as FEQL, the customer may be asked to input up to 61 parameters. The analysis software tool uses the values input by the customer and the raw data obtained from the tool string to generate a useable result. Depending on the skill level of the customer, the appropriateness of the values may vary, and subsequently result in varying degrees of robustness in the useable results.

SUMMARY OF INVENTION

In general, in one aspect, the invention relates to a method for supplying a customer with well log data comprising obtaining wellsite properties from the customer, recommending at least one tool string and analysis software tool combination using the wellsite properties, processing well log data using customer domain information and the least one tool string and analysis software tool combination to obtain processed well log data, viewing the processed well log data using an interactive viewer, manipulating the customer domain information, and updating the processed well log data on the interactive viewer using the manipulated customer domain information.

In general, in one aspect the invention relates to a system for supplying well log data to a customer comprising a wellsite system for obtaining wellsite properties from the customer and recommending at least one tool string and analysis software tool combination using the obtained wellsite properties, a well log data acquisition system for obtaining well log data using the recommended tool string and analysis software tool combination, a well log data processing system for processing well log data acquired by the well log acquisition system using customer domain information, and an interactive viewer for viewing the processed well log data and manipulating the customer domain information.

In general, in one aspect, the invention relates to a computer system for supplying well log data to a customer, comprising a processor, a memory, a storage device, a computer display, and software instructions stored in the memory for enabling the computer system under control of the processor, to perform obtaining wellsite properties from the customer, recommending at least one tool string and software analysis tool combination using the wellsite properties, processing well log data using customer domain information and the at least one tool string and software analysis tool combination to obtain processed well log data, viewing the processed well log data using an interactive viewer, manipulating the customer domain information, and updating the processed well log data on the interactive viewer using the manipulated customer domain information.

In general, in one aspect, the invention relates to an apparatus for supplying a customer with well log data comprising means for obtaining wellsite properties from the customer, means for recommending at least one tool string and software analysis tool combination using the wellsite properties, means for processing well log data using customer domain information and the at least one tool string and software analysis tool combination to obtain processed well log data, means for viewing the processed well log data using an interactive viewer, means for manipulating the customer domain information, and means for updating the processed well log data on the interactive viewer using the manipulated customer domain information.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method and system for supplying well log data to a customer. Further, in one or more embodiments of an interactive viewer may allow the customer to manipulate processed well log data. Also, the customer may be allowed to manipulate processed well log data using only parameters within the customer domain.

Figure 4:
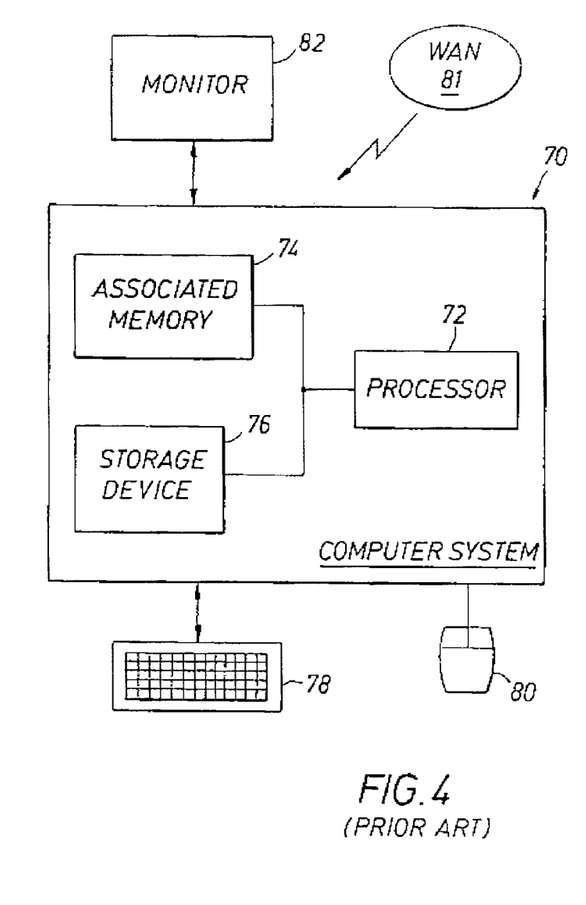
FIG. 4 shows a typical networked computer system.

The invention may be implemented on virtually any type computer regardless of the platform being used. For example, as shown in FIG. 4, a typical networked computer system (70) includes a processor (72), associated memory (74), a storage device (76), and numerous other elements and functionalities typical of today's computers (not shown). The computer (70) may also include input means, such as a keyboard (78) and a mouse (80), and output means, such as a monitor (82). The networked computer system (70) is connected to a wide area network (81) (e.g., the Internet) via network interface connection (not shown). Those skilled in the art will appreciate that these input and output means may take other forms in an accessible environment.

The term "well log data" as used in this description is intended to include data concerning properties of earth formations as is obtained from wellbores using well log instruments and as explained above in FIGS. 1 and 2.

However, the term "well log data" should be clearly understood as to also include other types of data acquired at the location of the well. Such data may include, without limitation, drilling dynamics data such as drill string torque, drill string weight, rotary drill speed, drilling fluid pump pressure, and flow rate. Such data may also include descriptions of drill cuttings, drilling exponent, mud gas chromatograph, and other data collectively known as "mud log" data. Accordingly, while the invention is related to acquisition of "well log" data, it should be clearly understood that the types of wellbore-related data which may be accessed and presented using a method and system according to the invention are not strictly limited to "well log" data. The types of data acquired at the wellsite may include data acquired with respect to depth in the wellbore, with respect to time, or with respect to both.

Figure 5:
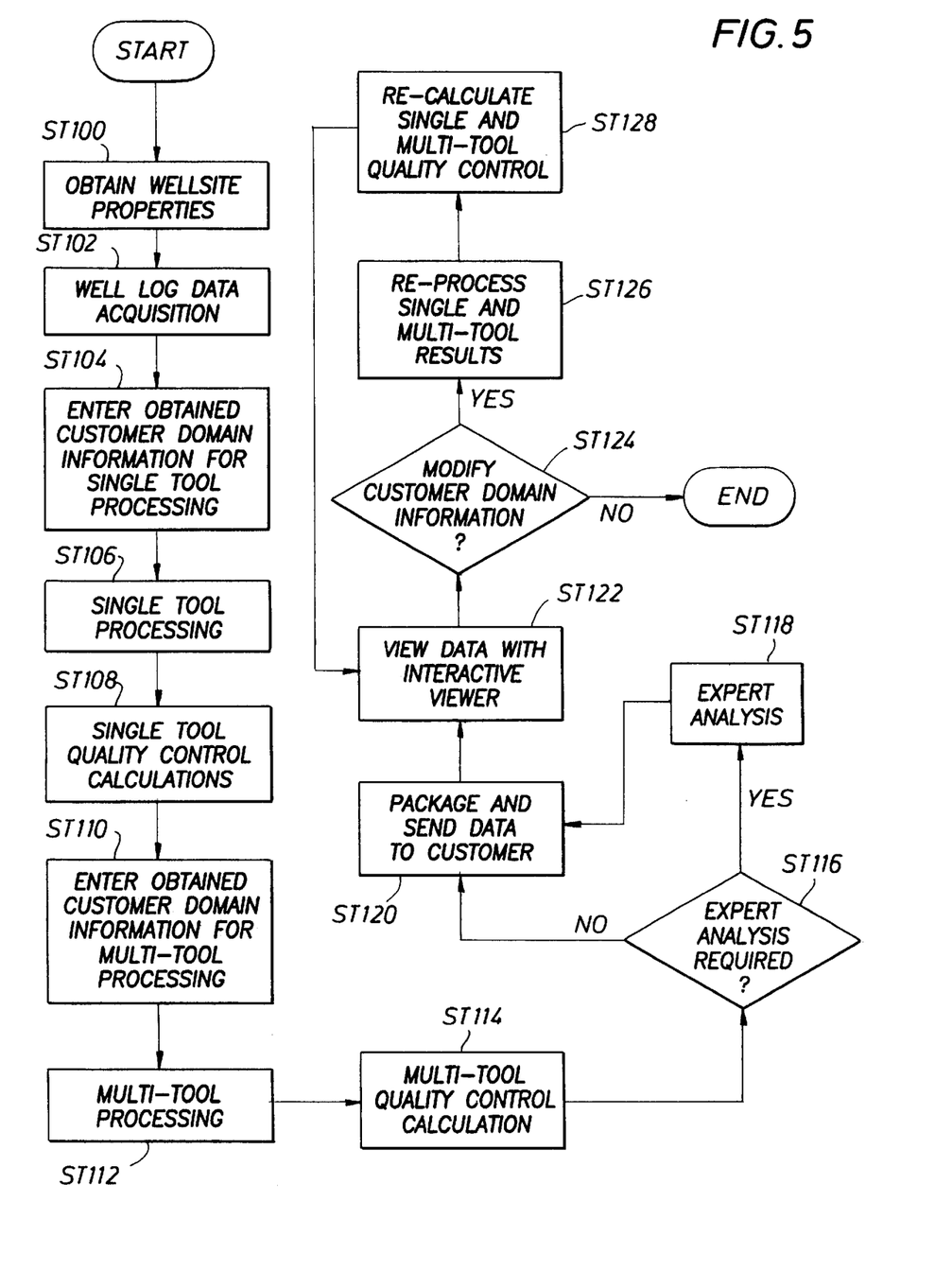
FIG. 5 shows a flowchart detailing the method in accordance with one embodiment of the invention.

FIG. 5 shows a flowchart detailing the method in accordance with one embodiment of the invention. Initially, the wellsite properties are obtained (Step 100). The wellsite properties include, but are not limited to, formation properties such as lithology, open hole or cased hole, formation fluid type, bit size and/or borehole size, borehole fluid type and weight, formation dip, borehole deviation, temperature, pressure, etc. Additionally, wellsite properties may also include information about the problem to be solved or specific information to be gathered such as information to quantify reserves and producibility, information to optimize the drilling process, information to optimize completions and perforations, etc.

The wellsite information may be obtained from an oil field customer ("customer") by an oil field services company ("OFS company") sales representative via a questionnaire and entered into a computer system, which may be networked, running the invention (i.e., the software corresponding to the portion of the invention that allows input of wellsite properties and makes a recommendation about the tool string and analysis software tool(s) the customer should use based on the wellsite properties). Alternatively, the customer may be prompted to enter information into a system running the invention. The system running the invention may be described as a pre-job planning system (i.e., a computer system used to plan a particular job, such as well logging to determine how to optimize completion). In one embodiment of the invention, a graphical user interface is provided that presents a multi-dimensional matrix to the customer or the OFS sales representative. The customer or OFS sales representative is subsequently able to choose the particular cell within the multi-dimensional matrix that represents the wellsite properties that exist at the wellsite the customer wishes to log.

The multi-dimensional matrix may be designed such that each cell within the matrix is associated with a recommended tool string and well log data processing software (i.e., analysis software tool). More specifically, in one embodiment of the invention the multi-dimensional matrix may include dimensions corresponding to formation characteristics (e.g., siliciclastics, carbonates, etc.), well operation parameters (e.g., mud type), and objectives for well logging involving what decisions to make and what data to acquire for future use (e.g., selecting depth for formation test, quantifying reserves, selecting completion method, etc.). Further, each cell of the multi-dimensional matrix may be associated with 0, 1, or n (n>1) options (i.e., best practice) where each option includes a recommended tool string and a recommended analysis software tool. Those skilled in the art will appreciate that wellsite properties may be represented in a variety of ways and that the examples described above should not be construed to limit the invention.

The analysis software tool referred to above, may include but is not limited to, software used to acquire data from the tool string, software to interpret the acquired data, and software to view the interpreted data. Further, the software analysis tool may minimize the number of inputs (i.e., customer domain information) required to process and interpret the acquired data, simplify the choice of input values for the customer domain, determine the quality/reliability of the results from the processing and interpretation of the acquired data, provide for digital data delivery of the data (via a CD or web-based ASP (application service provider), and provide a compatible interactive viewer (defined below) that only allows the customer to modify the customer domain information as specified in the recommended analysis software tool.

Figure 6:
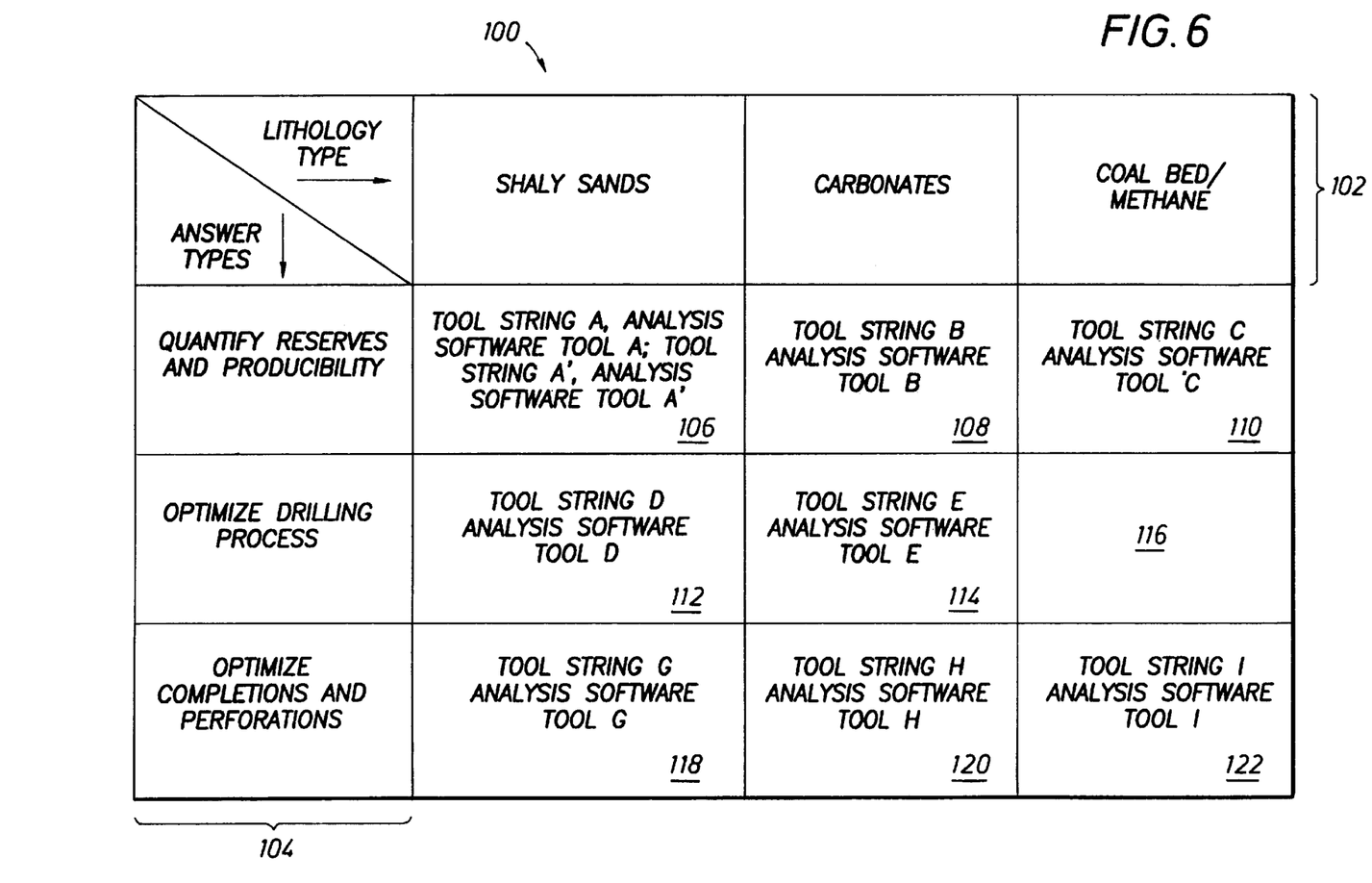
FIG. 6 shows a representation of two-dimensional matrix in accordance with one embodiment of the invention.

FIG. 6 shows a two-dimensional matrix in accordance with one embodiment of the invention. The two-dimensional, matrix (100) shown in Figure includes a header row (102) defining the lithology (e.g., shaly sands, etc.), and a header column defining the answer types (e.g., quantify reserves and producibility, etc.). For every lithology type—answer type combination, the recommended tool string and analysis software tool(s) is assigned a cell (106–122) corresponding to that combination. In some cases, such as cell (108), only one tool string and analysis software tool combination (e.g., Tool String B and Analysis Software Tool B) is recommended. In other cases, such as cell (106), more than one tool string and analysis software tool combination (e.g., Tool String A and Analysis Software Tool A, or Tool String A "and Analysis Software Tool A") is recommended. Additionally, in some cases, such as cell (116), no tool string or analysis software tool is recommended.

Returning to FIG. 5, using the wellsite properties, an appropriate tool string and analysis software tool is chosen. In particular, the tool string is chosen to acquire specific types of well log data and the analysis software tool is chosen to provide accurate interpretation of the well log the data based on the specific wellsite properties and the recommended tool string. Once the tool string is chosen, the well log data is acquired (Step 102). Once the well log data has been acquired, the customer is prompted to enter customer domain information required for single tool processing (Step 104). Customer domain information relates to information that can not be derived from the well log data, but is known to the customer. In accordance with an embodiment of the invention, an effort is made to limit the number of customer inputs needed. Thus, the customer is prompted only for the information necessary to provide the customer domain information. For example, if tool string is ECS, AIT, and PlatformExpress (PEx), then the customer domain information includes: apparent salinity, cation-exchange capacity porosity cut-off, water saturation cut-off, and permeability cutoff.

After the customer domain information is obtained the single-tool processing is performed (Step 106). The single-tool processing is performed in accordance with the processing/interpretation methods recommended using the information input in Step 100. During the single-tool processing step, information from the recommended tool string, well log data, or other sources is used to provide meaningful values for certain parameters within the various algorithms used to perform the singleprocessing. The values of these parameters are not obtained from the customer domain information. The algorithms used to perform processing and associated parameter values may be pre-selected according to the multi-dimensional matrix. The other sources referenced above may include, but are hot limited to, a database containing prior calculations conducted at the wellsite. These wellsite calculations may be used to generate meaningful values for the parameters. Additionally, a database containing representative default values for the particular wellsite properties and statistical analysis methods may also be used to obtain meaningful values for the parameters.

Once the singleprocessing is complete, the single quality control is calculated (Step 108). The quality control calculations may include, but are not limited to, statistical uncertainty factors, overall solution quality of a simultaneous solution (e.g., the simultaneous solution used to determine porosity), etc. In one embodiment of the invention, the single-tool quality control calculations are performed at every depth increment, (i.e., "level-by-level"). While not shown in FIG. 5, steps 104–108 may be repeated, as required, for each tool contained within the tool string.

Continuing the process, the customer may then be prompted to enter additional customer domain information, as required, for multi-tool processing (Step 110). The customer domain information for the purpose of multi-tool processing is similar to the customer domain information obtained from Step 104. The additional customer domain information is subsequently combined with the results of the singleprocessing and used as input in the multi-tool processing step (Step 112). The multi-tool processing is performed in accordance with the analysis software tool recommended using the information input in Step 100. Once the multi-tool processing is complete, the results of the singlequality control calculations are used as input for the multi-tool quality control calculations (Step 114). In one embodiment of the invention, the multi-tool quality control calculations are performed at every depth increment, (ie., "level-by-level"). The multiprocessing in Step 112 typically uses algorithms that are well known in the art. Further, during the multiprocessing, information from the well log data or other sources is used to provide meaningful values for certain parameters within the various algorithms used to perform the singleprocessing. The values of these parameters are not obtained from the customer domain information. The algorithms used to perform processing and associated parameter values may be pre-selected according to the multi-dimensional matrix.

Upon completion of the multi-tool quality control calculations, the results of the multi-tool quality control calculation are checked against a pre-defined threshold to determine if expert analysis is required 116). The pre-defined thresholds indicate the quality level of results from the multi-tool processing that are acceptable to the customer, and may be determined using industry standards, statistical analysis, etc. Thus, if the results of the multi-tool quality control calculations vary from the pre-defined threshold values, then the processed well log data is sent for expert analysis. In one embodiment of the invention, the data may be sent for expert analysis if results for of the multi-tool quality control calculations over a significant portion of the entire depth range or an important depth interval are outside the pre-defined threshold.

If expert analysis of the processed multi-tool well log data is required, the results are sent for expert analysis (Step The expert analysis may modify both customer domain information as well as the parameters in Step 106. The parameters and customer domain information are modified during expert analysis until the results of the multi-tool quality control calculations fall within the pre-defined threshold. Upon completion of expert analysis, the processed well log data is packaged and sent to the customer (Step 120). The data sent to the customer includes the original well log data, as well as the processed well log data and associated results of the quality control calculations. The data (i.e., original well log data, as well as the processed well log data and associated results of the quality control calculations) are packaged and sent to the customer via any number of conventional methods, such as compact disk (CD), digital data delivery, application service provider (ASP), etc. The data is delivered along with a means to view the data and the computed results. If the results of the multi-tool quality control calculation fall within the prethreshold then the process proceeds directly from Step 116 to Step 120.

Once the customer receives the data (i.e., original well log data, as well as the processed well log data and associated results of the quality control calculations), the customer views the processed well log data and associated results of the quality control calculations using an interactive viewer (Step 122). In one embodiment of the invention, the interactive viewer is a graphical user interface (GUI) that allows the customer to view the results of the multi-tool processing and quality control calculations. In particular, the interactive viewer allows the customer to manipulate the client domain information entered in steps 106 and 108. Further, the interactive viewer may be pre-configured to only allow the customer to modify the customer domain information in accordance with the selected tool string and analysis software tool. For example, the interactive viewer may be pre-configured based on the particular cell selected in the multi-dimensional matrix.

If the customer domain information is modified (either one or more variables) (Step 124), the interactive viewer triggers the single and multi-tool processing (Step 126) and single-tool and multi-tool quality control calculations, as required (Step 128).

The results of the re-processing and re-calculation are subsequently displayed (Step 122). In one embodiment of the invention, the software for the re-processing and re-calculation of the tools is integrated within the interactive viewer. Steps 122–128 may be repeated as often as required by the customer. If the customer does not wish to manipulate any customer domain information, then the process is completed.

As noted above the customer may only enter and modify the customer domain information during the processing steps of the method (i.e., Steps 106 and 112). The customer domain information, typically only includes a small set of parameters, however, those skilled in the art will appreciate that in any given computational analysis program (e.g., FEQL) there are a large number of parameters that the customer may input. For example, as noted above, FEQL contains 61 parameters that may be input by the customer. Using the present invention, if the tool string contains ECS, AIT and PEx, and FEQL is used to process the well logging data then only 5 parameters are necessary for the customer to input as customer domain information (i.e., apparent salinity, cation-exchange capacityporosity cut-off, water saturation cut-off, and permeability cutoff), with the remaining parameter values being set using methodology described in Step 106 above.

The quality control calculations described above in Step 108 and 114 include not only the calculations to verify the integrity of the acquired well log data but also the robustness of the results of the processed well log data. In one embodiment of the invention, the robustness of the processed well log data is initially calculated for the single-tool and multi-tool processing at the wellsite and stored as quality control flags ("flags"). Flags are generated for each of the key computational phases, for example, if the tool string included ECS, AIT and PEx the computational phases would include: mineralogy, porosity, permeability, saturation, and relative permeability/producibility. The flags may be binary indicators, where a value of zero indicates that the result is good and a value of one indicates that the result is bad. The flags may be driven primarily by the quality control indicators (e.g., integrity of acquired well log data) on the input measurements. Flags for different phases may also be used in the derivation of flags for subsequent phases, as appropriate. The flags are subsequently sent to the customer where they are viewed using the interactive viewer. The flags may indicate to the customer where they would like to manipulate the customer domain information. Further, once the customer domain information has been manipulated the interactive viewer will update the flags, as required.

Figure 7:
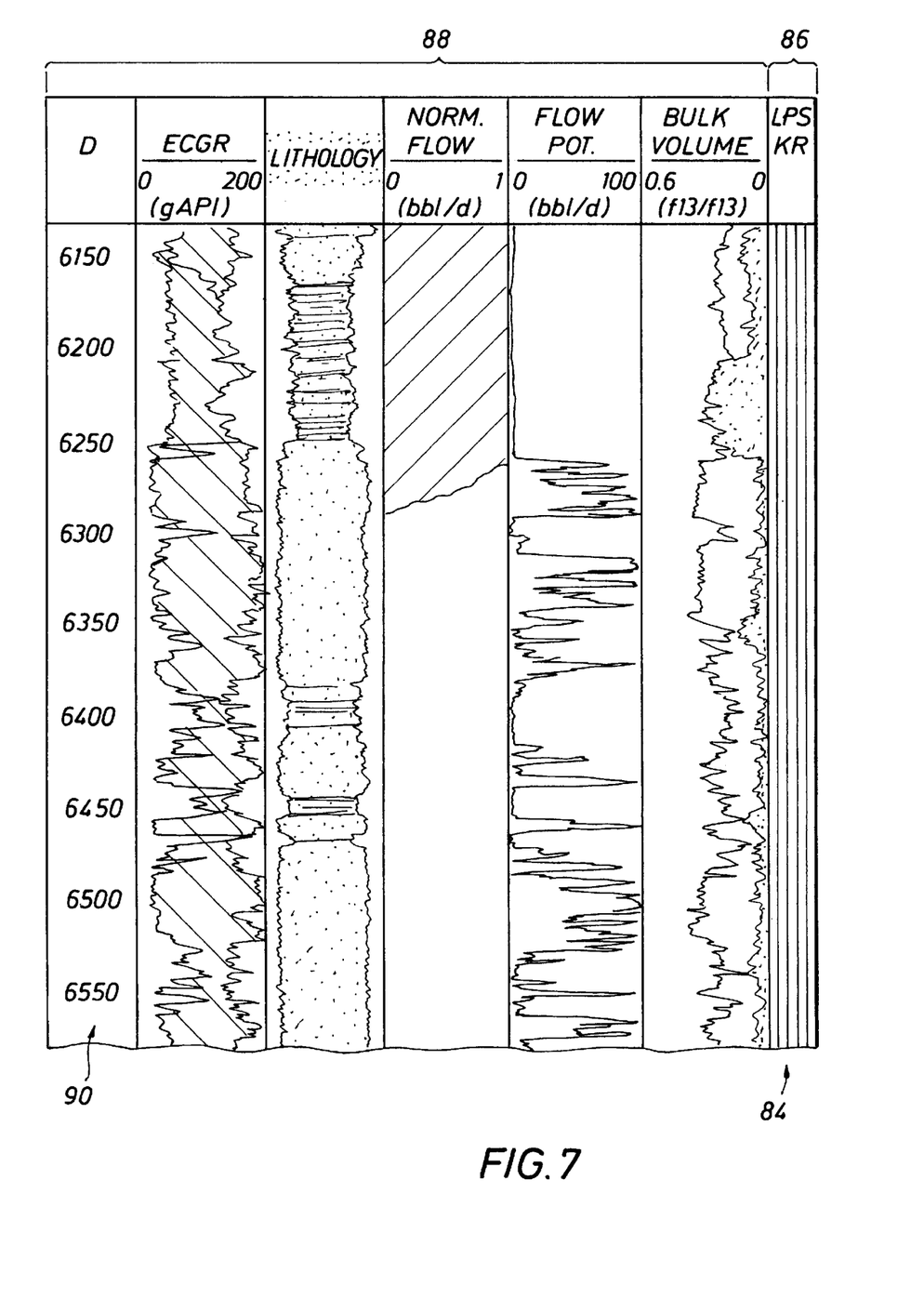
FIG. 7 shows a screen shot of an interactive viewer in accordance with one embodiment of the invention.

FIG. 7 shows a screen shot of an interactive viewer in accordance with one embodiment of the invention. The interactive viewer (84) displays results from the multi-tool processing such as lithology, Environmentally Corrected Gamma Ray (ECGR), normal flow, open-flow potential, bulk volume, etc., as a series of columns (88). Adjacent to the columns is a graphical representation of the results of the multi-tool quality control calculations (86).

In addition, though not shown in FIG. 7, the customer domain information may also be adjusted via the interactive viewer (84). For example, the interactive viewer (84) may allow the customer to manipulate the customer domain information via, a textbox, a log display with graphical selection using a line selector overlaying a relationship curve (e.g., a water resistivity curve), a log display with a graphical selection using a line selector overlaying a distribution (e.g., a T2 distribution), a thickness cross plot with graphical selection using a line selector overlaying a cross plot of interest (e.g., porosity versus net pay sensitivity cross plot), etc.

Further, the interactive viewer (84) may allow the customer to manipulate the customer domain information for specific zones. For example, the interactive viewer (84) allows the customer to choose a specific zone or set of zones and for each zone modify the customer domain information independently from other zones. The zones may be defined using depth track (90).

Embodiments of the invention may have one or more of the following advantages. The invention is a single, integrated package minimizing the effort of a customer by recommending a tool string of the necessary yet sufficient number and type of well log tools to provide the customer based on the requested information (e.g., a given set of environmental conditions and a given set of one or more decisions to be made). The invention also decreases the amount of customer input required and simplifies the choice of input values in the processing stage allowing for results that are more robust. Further, the invention provides the customer with the ability to modify parameters within the customer domain using an interactive viewer. In addition, within the interactive viewer, the invention also provides the results of the quality control calculations to allow the customer to determine the quality of the results. Additionally, the invention simplifies the process of selecting, in advance, the correct well logging tools and analysis software tools for the particular problems the customer faces in a specific well environment. Further, the invention provides results to a customer in a timely fashion, readily available during or immediately after data acquisition.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for supplying a customer with well log data comprising:
   inputting wellsite data into a processor;
   said processor automatically processing instruction to recommend well tool and software combination using the input wellsite data;
   obtaining subsurface data using a recommended well tool and software combination;
   processing the obtained subsurface data using customer domain input information and the software; and
   making the processed data viewable.

2. The method of claim 1, said processing of the obtained subsurface data including performing single-tool and multi-tool calculations.

3. The method of claim 2, further comprising sending the processed data for automated analysis if results of the single-tool or multi-tool calculations are outside set parameters.

4. The method of claim 1, wherein wellsite data comprises at least one of the group consisting of formation properties, borehole properties, well tool parameters, and borehole fluid properties.

5. The method of claim 1, wherein said processor recommends the tool using a multi-dimensional matrix, wherein cells in the matrix represent wellsite properties.

6. The method of claim 1, wherein processing the obtained subsurface data comprises single-tool processing and multi-tool processing.

7. The method of claim 1, further comprising re-processing the obtained subsurface data using manipulated customer input information.

8. A system for supplying well log data to a customer comprising:
   input means to receive wellsite data;
   a processor to process instructions to recommend a well tool and software combination using the input wellsite data;
   a well logging system for obtaining subsurface data using the recommended well tool and software combination;
   a processor to process the data acquired by the well logging system using customer input information and the software; and
   an viewer for viewing the processed data.

9. The system of claim 8, wherein the well log data processor processes instructions to performs single-tool and multi-tool calculations.

10. The system of claim 9, wherein said processor processes instructions to send the well log data for automated analysis if the single-tool or multi-tool calculations are outside set parameters.

11. The system of claim 8, wherein wellsite data comprises at least one of the group consisting of formation properties, borehole properties, well tool parameters, and borehole fluid properties.

12. The system of claim 8, wherein the processor uses a multi-dimensional matrix to recommend the well tool wherein cells in the matrix corresponds to wellsite properties.

13. The system of claim 8, wherein said processor processing the subsurface data using single-tool processing and multi-tool processing.

14. The system of claim 8, wherein the viewer allows the customer to divide the processed data into a plurality of zones.

15. A computer system for supplying well log data to a customer, comprising:
- a processor;
- a memory;
- a storage device;
- a computer display; and
- software instructions stored in the memory to enable the computer system under control of the processor, to:
  - accept wellsite data from the customer;
  - recommend well tool and software combination using the wellsite data;
  - process well log data using customer input information and the well tool and software combination;
  - view the processed well log data using viewer;
  - manipulate the customer input information; and
  - update the processed well log data using the manipulated customer input information.

16. An apparatus for supplying a customer with well log data comprising:
- means for inputting wellsite data into a processor;
- automated means for recommending well tool and software combination using the wellsite data;
- means for processing well log data using customer input information and the well tool and software;
- means for viewing the processed well log data;
- means for manipulating the customer input information; and
- means for updating the processed well log data using the manipulated customer input information.

17. A system for supplying well log data to a customer, comprising:
- a processor to accept well data;
- the processor adapted with instructions to automatically output a well tool and software combination based on said well data;
- said processor instructions including accessing a multi-dimensional matrix including cells corresponding to wellsite properties; and
- a processor to process data obtained using said well tool and software combination, wherein said processor re-processes said data based on newly input or manipulated well data; and
- a viewer to display the processed data.

* * * * *